United States Patent [19]

Corpew

[11] 4,107,582

[45] Aug. 15, 1978

[54] CHARACTER SELECTOR FOR A SHAPED BEAM CATHODE RAY TUBE

[75] Inventor: Charles Robert Corpew, El Cajon, Calif.

[73] Assignee: Stromberg Datagraphix, Inc., San Diego, Calif.

[21] Appl. No.: 707,264

[22] Filed: Jul. 21, 1976

[51] Int. Cl.[2] ........................ G06K 15/20; H01J 31/16

[52] U.S. Cl. .................................... 315/365; 313/410; 335/213

[58] Field of Search ................ 315/365, 399; 313/410; 335/213, 214; 336/226

[56] References Cited

U.S. PATENT DOCUMENTS

| | | | |
|---|---|---|---|
| 3,329,858 | 7/1967 | McNaney | 313/410 |
| 3,473,077 | 10/1969 | Corpew | 315/365 |
| 3,875,543 | 4/1975 | Gostyn et al. | 335/213 |

*Primary Examiner*—Maynard R. Wilbur

*Assistant Examiner*—T. M. Blum

*Attorney, Agent, or Firm*—Frank D. Gilliam

[57] ABSTRACT

A character selector for a shaped beam cathode ray tube comprising an orthogonal pair of air core deflection coils each of which consists of two identical halves formed to fit snugly over the neck of the cathode ray tube. The coils are continuous windings of electrically conductive material and comprise three sections which in operation cause an on-axis electron beam to be sequentially deflected off-axis, converged back to the axis and then referenced along the axis so that the final path of the beam, sequentially deflected on off-axis excursion paths through various shaping apertures in a stencil, is dependent of its off-axis excursion. The character selector may include magnetic material placed over at least a portion of the windings to provide a fine adjustment of the relative magnetic field strength as well as for enhancing the magnetic efficiency and shielding of the device.

8 Claims, 5 Drawing Figures

FIG. 1
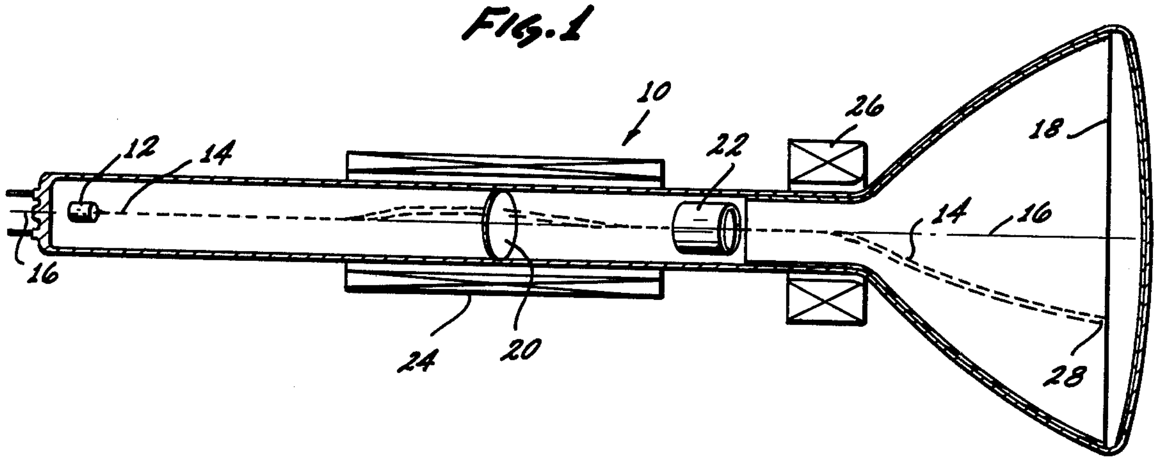
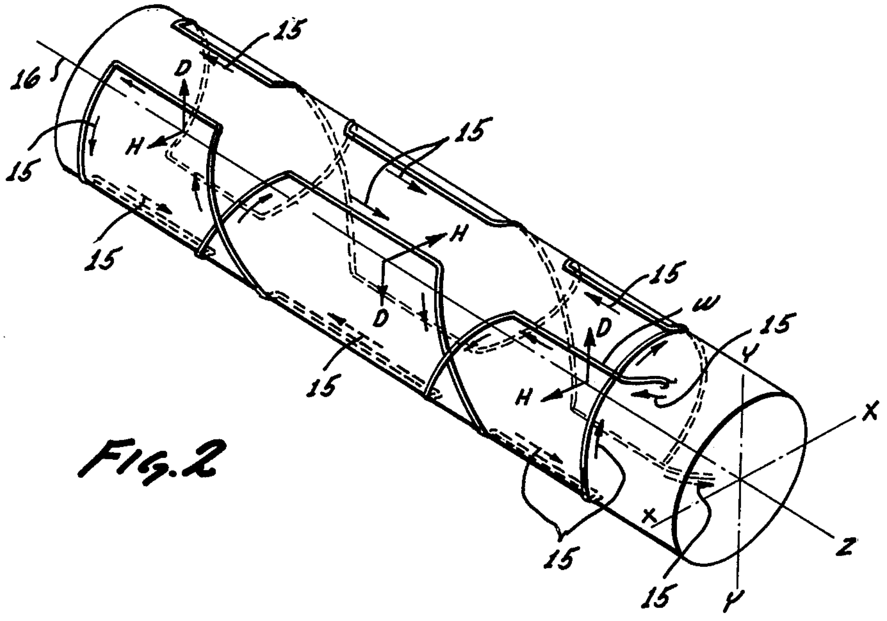
FIG. 2

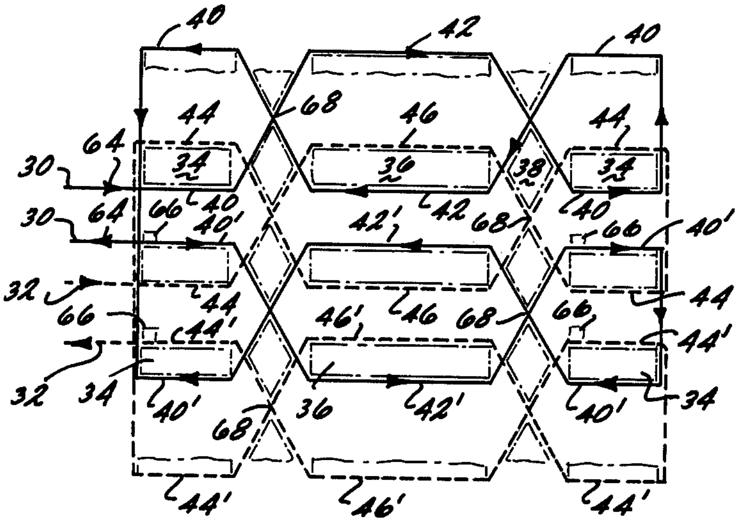
FIG. 3
FIG. 4
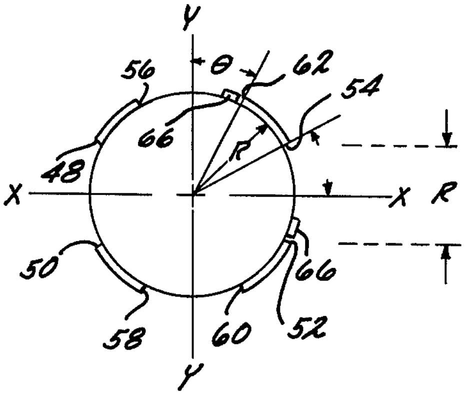
FIG. 5
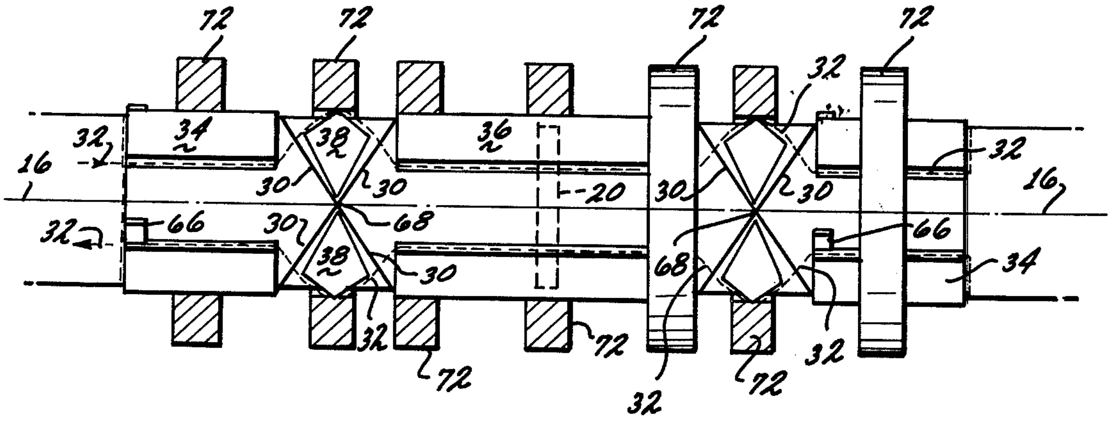

CHARACTER SELECTOR FOR A SHAPED BEAM CATHODE RAY TUBE

BACKGROUND OF THE INVENTION

This invention relates to electron beam deflection yokes for cathode ray tubes and more specifically to a single pair of coils for controlling the electron optics path of the electron beam of a shaped beam cathode ray tube. U.S. Pat. No. 3,473,077, by the same inventor and the same assignee of the instant invention discloses the state of the art in shaped beam cathode ray tubes and the state of the art means for electron beam control for character selection from a plurality of shaped apertures in a stencil through which the beam is extruded. The disclosed means is by the use of three separate pairs of coils whose composite action is such that the electron beam is directed from its axial path through a shaping aperture and then returned to an extension of its original path. The pairs of coils which are referred to as the selection convergence and reference yokes either have separate two axis deflection power supplies or are connected in series using a single two axis deflection power supply.

Deflection windings consist, generally, of paraxial segments which create a useful deflection field, and undesirable but necessary arcuate end connections which have components that, being normal to the beam direction, do not contribute to deflection but instead create distortive influences. The coils for deflection in a specified direction are wound in such a way that for each wire component, there is a diametrically opposite component of wire such that the resultant effect of the components at an axial point is supplemental with respect to the component of flux that will create the desired deflection but is a minimum for the unused components along the other two orthogonal axis. For off-axis points this cancellation of undesirable deflection effects becomes less and less effective as the off-axis distance increases. The distortion influence of the undesirable components of the winding normal to the beam axis limits the ability of the conventional three yoke system to perform shaped beam character selection in the regions intermediate to the selection and convergence yokes and to the convergence and reference yokes where the beam is at its maximum off-axis excursion and thus is most subject to the aforesaid limitations. The end turn effects of commercially available deflection yokes are usually reduced by shaping or bending up the end turns. This practice, however, is not consistent with the efficient use of wire for providing maximum deflection efficiency.

The use of three separate pairs of coils, each pair similar to the conventional two axis deflection yoke requires more power to operation, more material for construction, requires a more complicated alignment procedure for proper character selection and has more susceptibility to failure then a single pair of coils.

SUMMARY AND OBJECTS OF THE INVENTION

The present invention provides an improved performance over that of the existing state of the art wherein three separate pairs of coils are used with a shaped beam cathode ray tube for character selection.

Accordingly, it is a principle object of this invention to improve the distortive influence of the character selection of the new existing state of the art by providing a single pair of coils with inherent alignment that provides a higher degree of cancellation of undesirable effects presently caused at the regions intermediate the selection and convergence yokes and the convergence and reference yokes.

Another object of the instant invention is to provide an improved means for selection control of the electron beam of a shaped beam cathode ray tube.

Another object of the instant invention is to reduce the complexity of beam control apparatus.

Another object of the instant invention is to reduce beam control power consumption.

Another object of the instant invention is to reduce the overall weight of the apparatus required for beam control.

Another object of the instant invention is to provide a mechanical fine adjustment for convergence.

Another object of the instant invention is to reduce the initial set up time of the beam control apparatus.

A further object of the instant invention is to achieve improved registration accuracy.

These and other objects of the invention will become apparent to those skilled in the art from the following description, taken in connection with the drawings wherein:

DESCRIPTION OF THE DRAWINGS

FIG. 1 is a diagrammatic showing of a shaped beam cathode ray tube and its deflection system.

FIG. 2 is an isometric view of the winding of a typical coil of the instant invention.

FIG. 3 is a flat pattern view of the development of the cylindrical shaped coil pair of the instant invention.

FIG. 4 is a diagrammatic cross section of FIG. 3 showing the orientation of conductors which form the selector coils.

FIG. 5 is a partial cutaway side view of the character selector with magnetic cores positioned thereon.

DESCRIPTION OF THE PREFERRED EMBODIMENT

Throughout the drawings and specifications, the same reference numerals are used in the various figures to depict the identical element or part.

Generally stated, the character selector of the invention is suitable for a shaped beam cathode ray tube as disclosed in the U.S. Pat. No. 3,473,077, as well as other similar devices.

Referring now to FIG. 1, the tube 10 comprises an elongated envelope having at one end thereof an electron gun 12 for producing an electron beam 14 aligned on a central axis 16. A target 18 is provided at the other end of the envelope and a stencil 20 is positioned between the electron gun 12 and a focusing element 22. The stencil 20 has a plurality of apertures (not shown) for shaping the cross-section of the electron beam 14 passing therethrough. A character selector 24 having X and Y axis deflection control over the electron beam 14 is positioned over the stencil 20. The character selector provides control over the electron beam for selectively causing a beam to be deflected from the central axis 16 through sequently selected apertures of stencil 20, then converged back to the central axis 16 and then referenced along the central axis so that the final beam path is independent of the various off-axis excursions. A deflection yoke 26 is positioned between the character selector 24 and the target 18. The deflection yoke 26 operates in a conventional manner to position the impact area of the electron beam at a selected location 28 on the target 18 at a selected time.

FIG. 2 shows an isometric view of one of the typical air core coils of the two coil character selector of the instant invention. The other coil, not shown, would be axially identical to but rotated 90° from the one shown. The electron beam 14 of the cathode ray tube 10 generally follows a path along the central axis 16 from the electron gun 12 to the target 18, see FIG. 1. The passing of current I through the coil shown, in the direction of arrows 15 produces a magnetic field in the direction indicated by the arrows, H, which causes the electron beam to be deflected at right angles as indicated by the vectors D. The magnitude of the off-axis electron beam movement is linearly dependent upon the product of current and coil length.

Referring now to FIGS. 3 and 5, the solid line 30 denotes one pair of opposing windings of either the X or Y deflection coil and the dotted line 32 denotes the other. It should be noted that the coils 30, 32 are each wound identically from a continuous roving of electrical conductive material, such as a magnet wire, but are not limited thereto. In the embodiment shown, the coils 30, 32 are shown wound around a series of short and long rectangular and diamond shaped winding blocks 34, 36, 38, respectively, about the neck of the tube so as to position the longitudinal short and long straight windings 40, 42, respectively, diametrically opposed to 40', 42' of the one coil and 44, 46 diametrically opposed to 44', 46' of the other coil. In this embodiment, all sections of the windings have an equal number of turns with the central section having twice the length of the end portions. The length of the various sections of the coils should not be considered as a limiting factor as the only requirements for the coil configuration is that the electron beam be directed from the central axis, through a selected aperture in the stencil and returned to and coincident with the central axis.

The orientation of the straight current carrying segments are positioned as shown in FIGS. 3 and 4, at an angle $\theta$ with respect to the corresponding X and Y deflection axis of the tube, for example, positions 48, 50, 52, 54 are for horizontal or X axis control while 56, 58, 60, 62 are for vertical or Y axis control. The magnetic field will be most uniform if the wires on the surface of a cylinder of radius R are spaced so that the distance between corresponding turns of two coil halves is equal to R. It has been experimentally verified that this wire position, wherein $\phi$ is equal to arc tan 0.5, provides optimum selection linearity. Deviation from this value results in a barrel or pin cushion tendency which may be desirable in some applications where geometrical deflection errors are to be compensated for.

Referring now specifically to FIG. 3, the arrow heads 64 indicate the direction of the rovings of the electrical conduction material as well as the current flow. The winding begins by laying the conductive material along the first short winding block 34 up along and between two diamond shaped winding blocks 38 and along long winding block 36, down along and between two more diamond shaped winding blocks 38, along another short winding block 34, up to and along another short winding block 34, down along and between two diamond shaped winding blocks 38, along another long winding block 36, up and between the first two diamond winding blocks 38, along another short winding block 34, down along a locking block 66, for holding the winding tight against the adjacent short winding block 34, along short winding block 34 and so on as shown by the arrow heads 64. At each pair of diamond winding blocks there is a current cross-over section 68 where the winding transfers from one side of the tube neck to the other side, for example, 54 to 48 and 52 to 50 (see FIG. 4).

The winding blocks may be attached to the tube neck or attached to a coil form that fits over the tube neck. The number of turns and the length of each coil determines the electrical characteristics of the coil. For example, a practical coil for a typical character selector for the aforementioned cathode ray tube uses approximately four turns of AWG #28 magnet wire and has an inductance of about 20 micro henries and a D.C. resistance of about 0.5 ohms.

Referring now specifically to FIG. 5, in addition to the windings, as shown in FIGS. 2 and 3, there is placed around the coils, a plurality of toroid rings 72 of ferrite material as discussed in U.S. Pat. No. 3,007,887, but not limited thereto. Longitudinal positioning of the rings allows for fine adjustment of the aforementioned off-axis beam path convergence requirement. Other magnetic material such as laminated steel alloys or the like may be equally appropriate. One of the rings 72 is positioned over each of the cross-over section 68 for precise fine control of the convergence deflection angles relative to those of the two divergent sections of the character selector 24; for example, when either ring 72 is moved toward the convergence side of the cross-over section, the convergence angle will increase and the other angle will decrease or vice versa. When the two rings that are over the cross-over sections are properly adjusted, the final position and direction of the shaped beams will be independent of the input selection signal. One of the rings is centered over each of the short straight sections, one is centered over the central section and one is positioned on each end of the central section. These rings enhance the magnetic efficiency of the coils by providing low reluctance paths for the magnetic flux.

It should be obvious to those working in this art that the windings of the coils may be constructed by various other methods. One of those other methods would be to form the windings by etched or printed circuit techniques. Another method would be to form the coils by layers of pliant material wrapped around the neck of the cathode ray tube, wherein each layer has at least one winding of the coil disposed thereon and the several wrappings form the coil as shown by FIGS. 2 and 5.

OPERATION OF THE PREFERRED EMBODIMENT

The shaped beam cathode ray tube is connected in a conventional manner as set forth in the referenced U.S. Pat. No. 3,007,887. The electron beam is maintained at a constant velocity in the area of the character selector 24.

The character selector 24 has a character selection circuit (not shown) including separate amplifiers for driving the X and Y windings. The conventional deflection yoke 26 is similarly connected to appropriate X and Y amplifier circuits (not shown) to position the selected character at a desired position on the target 18.

The tube is energized causing the electron beam to follow a central path along 16. The magnetic field established by the currents in the winding portion of the X and Y coils nearest the electron gun cause the electron beam within the magnetic field of this portion of the selector yoke to be deflected from its axial path. Application of proper currents causes the electron beam to impinge on the stencil 20 and be extruded into a specific cross sectional shape as it passes through the selected aperture. The composite effect of the initial straight section and the first half of the second or central section is to cause the beam to impinge normally on an area of the stencil centered about the desired aperture.

After passing through the selected aperture in the stencil, the shaped electron beam is turned from its paraxial path back toward the central axis 16 by the magnetic field established by the last half of the central straight section. The angle through which the beam is deflected by the center section of the yoke 24, when the end coil portions are substantially of equal length as shown, is normally twice the deflection angles imparted by the end sections; thus, assuming constant electron beam velocity and uniform magnetic fields, the same flux density is required for the three coil sections.

The portion of the coils nearest the target causes the electron beam to deflect an amount sufficient to cause it to become coaxial with the central axis 16 once again. The directions of current flow in the end sections are the same causing the directions of electron beam influence to be the same. The direction of current flow through the central straight portion is opposite to the direction of the end section current flow causing the electron beam influence to be in the opposite direction.

After passing through the character selector 24, the electron beam is once again on the central axis 16 of the tube. The electron beam is then focused by the focusing element 22 and directed to a specific position on the target by the X and Y current flow through the conventional deflection yoke 26.

It may be seen that the invention provides an improved character selector yoke having a single pair of coils of unitary construction.

Various modifications of the invention, in addition to those shown and described herein, will become apparent to those skilled in the art from the foregoing description and accompanying drawings. Such modifications are intended to fall within the scope of the appended claims.

What is claimed is:

1. A unitized selector for a shaped beam cathode ray tube including a neck with a central axis therethrough, positioned within said neck is an electron gun producing an electron beam directed along said central axis and a stencil having a plurality of apertures therethrough, said apertures arranged in a two dimensional pattern for shaping the cross-section of said electron beam passing through one of said plurality of apertures, comprising a pair of interacting shaped coils substantially longitudinally disposed on said neck, each of said coils comprises at least a single winding shaped to form three principal sections, and two cross-over sections for directing said electron beam on an off-axis trajectory through a selected one of said plurality of apertures, first on a path away from said central axis, then along a path convergent with said central axis, and then along a path coincident with said central axis, whereby said pair of interacting shaped coils have inherent alignment that provides a high degree of cancellation of undesirable effects.

2. The invention as defined in claim 1, wherein each of said coils comprises a plurality of windings for directing said electron beam.

3. The invention as defined in claim 1, wherein a plurality of magnetic efficiency enhancing and shielding means are positioned around portions of said coil sections such that positioning of said magnetic efficiency enhancing means provides fine adjustment over said electron beam trajectory.

4. The invention as defined in claim 1, wherein each winding of said pairs of shaped coils is wound from a continuous roving of magnetic wire providing two orthogonal axes of deflective control of said electron beam.

5. The invention of claim 1, wherein said pair of shaped coils are comprised of formed conductors on layers of pliant substrates disposed around said neck.

6. The inventon as defined in claim 1, wherein the influence on the electron beam of the center one of said principal sections of the winding is substantially equal but of opposite polarity to the combined influence of said other two said principal sections of the winding.

7. The invention as defined in claim 1, wherein the windings comprising said principal sections are parallel to said central axis.

8. The invention as defined in claim 1, wherein seven of said magnetic enhancing and shielding means are utilized, one at the center of each of said principal sections, one at each end of the center one of said principal sections, and one, whose position provides adjustment of said trajectory, approximately over each of said cross-over sections.

* * * * *